(12) United States Patent
Iyoha

(10) Patent No.: US 9,541,290 B2
(45) Date of Patent: Jan. 10, 2017

(54) EFFICIENT FURNACE OPERATION WITH MEDIUM-PURITY OXYGEN

(71) Applicant: Osemwengie Uyi Iyoha, Amherst, NY (US)

(72) Inventor: Osemwengie Uyi Iyoha, Amherst, NY (US)

(73) Assignee: PRAXAIR TECHNOLOGY, INC., Danbury, CT (US)

(*) Notice: Subject to any disclaimer, the term of this patent is extended or adjusted under 35 U.S.C. 154(b) by 155 days.

(21) Appl. No.: 14/679,149

(22) Filed: Apr. 6, 2015

(65) Prior Publication Data

US 2015/0308685 A1 Oct. 29, 2015

Related U.S. Application Data

(60) Provisional application No. 61/983,854, filed on Apr. 24, 2014.

(51) Int. Cl.
| | |
|---|---|
| *F27D 17/00* | (2006.01) |
| *F23L 7/00* | (2006.01) |
| *F23L 15/02* | (2006.01) |
| *C03B 5/235* | (2006.01) |

(52) U.S. Cl.
CPC ............. *F23L 7/007* (2013.01); *C03B 5/2353* (2013.01); *F23L 15/02* (2013.01); *F27D 17/004* (2013.01); *F27D 2017/007* (2013.01); *Y02E 20/344* (2013.01); *Y02P 40/535* (2015.11); *Y02P 40/55* (2015.11)

(58) Field of Classification Search
CPC ............ C03B 5/237; F23L 2900/07007; F27D 2017/007; F27B 3/263
USPC .............................. 432/179, 180, 181, 182, 28
See application file for complete search history.

(56) References Cited

U.S. PATENT DOCUMENTS

| | | | |
|---|---|---|---|
| 3,633,886 A | * | 1/1972 | Froberg .................. C03B 5/235 432/161 |
| 4,643,743 A | | 2/1987 | Grader |
| 4,725,299 A | | 2/1988 | Khinkis et al. |
| 4,867,766 A | | 9/1989 | Campbell et al. |

(Continued)

FOREIGN PATENT DOCUMENTS

| | | |
|---|---|---|
| EP | 0928938 A1 | 7/1999 |
| JP | 2013170741 A | 9/2013 |

*Primary Examiner* — Gregory A Wilson
(74) *Attorney, Agent, or Firm* — Donald T. Black

(57) ABSTRACT

Disclosed is a method of operating a furnace containing a charge to heat the charge, comprising wherein gaseous oxidant comprising 60 vol. % to 85 vol. % oxygen is passed through a heated regenerator and into the furnace, so that the oxidant is heated to emerge from an oxidant port at a temperature of 500° C. to 1400° C., and gaseous fuel is fed into said furnace through two or more fuel ports; and the heated oxidant and fuel are combusted in the furnace to produce gaseous hot products of said combustion which heat the charge; and then the flow of oxidant through the regenerator into the furnace is discontinued, and said combustion products are passed into said oxidant port and through and out of said cooled regenerator to heat said regenerator, wherein the temperature of the combustion products that pass out of said regenerator is at least 500° C.; under dimensional and operational conditions which attain functional and economic advantages.

11 Claims, 2 Drawing Sheets

(56) References Cited

U.S. PATENT DOCUMENTS

| | | | | |
|---|---|---|---|---|
| 5,921,771 A | * | 7/1999 | Kobayashi | F23L 15/02 |
| | | | | 432/179 |
| 6,159,003 A | | 12/2000 | Duboudin et al. | |
| 7,168,269 B2 | * | 1/2007 | Simpson | C03B 5/193 |
| | | | | 65/134.1 |
| 2010/0199722 A1 | | 8/2010 | Galley et al. | |
| 2015/0004552 A1 | * | 1/2015 | Kang | C03B 5/2353 |
| | | | | 432/180 |
| 2015/0344345 A1 | * | 12/2015 | Kobayashi | C03B 5/2353 |
| | | | | 65/134.4 |

* cited by examiner

EFFICIENT FURNACE OPERATION WITH MEDIUM-PURITY OXYGEN

CROSS REFERENCE TO RELATED APPLICATIONS

This application claims the benefit of priority to U.S. provisional application Ser. No. 61/983,854 filed on Apr. 24, 2014, the disclosure of which is incorporated by reference herein in its entirety.

FIELD OF THE INVENTION

The present invention relates to high-temperature furnace operation in which heat is provided to a charge, such as glassmaking materials, by combustion of fuel and an oxygen-containing stream having an oxygen content higher than that of air.

BACKGROUND OF THE INVENTION

Many industrial operations require heating materials to a high temperature in a furnace or equivalent apparatus. The requisite high temperature can be provided by combusting fuel with air, at a rate sufficient to provide heat of combustion that heats the materials. More recently, in operations termed "oxy-fuel", the air as a source of oxygen is replaced by a gaseous feed containing more than 90 vol. % oxygen. Combustion with oxygen having such a high purity provides numerous advantages including attaining high temperatures, less diversion of heat to the non-reactive components of the feed air, and a lessened tendency to form nitrogen oxides.

One of the drawbacks of oxy-fuel melting is the higher operating cost. Using a gaseous feed stream with less than 90 vol. % oxygen as the oxidant, such as diluting a high purity oxygen from liquid supply stream with air, can reduce the unit cost of contained oxygen. However, using low purity oxygen reduces the energy efficiency of the oxy-fuel system, increasing the fuel consumption and, in turn, increasing the oxygen consumption, relative to the base case. Furthermore, if not properly managed, the resulting higher nitrogen content in the oxidant coupled with the high temperature flame can adversely impact NOx emissions from the process.

However, the present invention recognizes that when coupled with a heat recovery device such as a regenerator, even more advantages such as improved energy efficiency, reduced emissions, and improved furnace operation can be realized with operation using oxidant in which the oxygen content is less than what is used in oxy-fuel combustion.

BRIEF SUMMARY OF THE INVENTION

One aspect of the invention is a method of operating a furnace which contains a charge to heat the charge, comprising:

(A) providing gaseous oxidant comprising 60 vol. % to 85 vol. % oxygen;

(B) passing the gaseous oxidant through a heated regenerator and out of an oxidant port into a furnace, to heat the oxidant in the regenerator so that it emerges from the oxidant port at a temperature of 500° C. to 1400° C., and to thereby cool said regenerator; and feeding gaseous fuel into said furnace through two or more fuel ports and combusting the fuel in the furnace with heated oxidant emerging from said oxidant port to produce gaseous hot products of said combustion which heat the charge;

(C) discontinuing the flow of oxidant through the regenerator into the furnace, and passing said combustion products into said oxidant port and through and out of said cooled regenerator to heat said regenerator, wherein the temperature of the combustion products that pass out of said regenerator is at least 500° C.; and (D) alternating steps (B) and (C), wherein said oxidant port and said fuel ports are located above the top surface of said charge in said furnace;

wherein at least one of said fuel ports is located on each side of a vertical line passing through the center of said oxidant port and said fuel ports are located 10 to 60 fuel port diameters from said oxidant port; and wherein the fuel that is combusted with oxidant from a given oxidant port is fed into the furnace from a fuel port that is on one side of said line at a velocity of 40 to 350 m/sec and from a fuel port and the oxidant is fed into the furnace from the oxidant port at a velocity of 2 to 20 m/sec, wherein the fuel fed from said fuel ports entrains gaseous combustion products in said furnace before combusting with the high temperature oxidant stream.

By controlling the fuel velocities of the fuel ports, through the use of independent adjustable flow controllers, the flame shape and characteristics can be varied and the energy release profile can be controlled inside the furnace and close to the refractory side walls. This flexibility avoids overheating of the furnace refractory walls or the charge material by the high temperature flame.

DETAILED DESCRIPTION OF THE INVENTION

Figure 1:
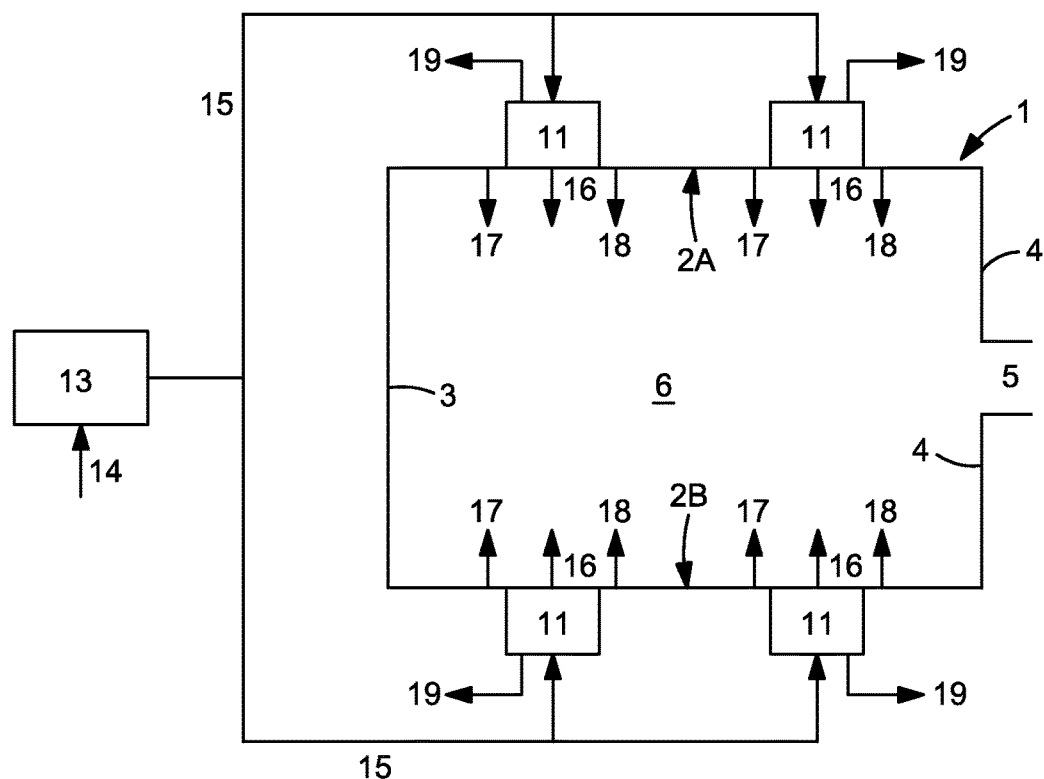
FIG. 1 is a schematic top view of an embodiment of a furnace and associated equipment with which the present invention can be practiced.
Figure 2:
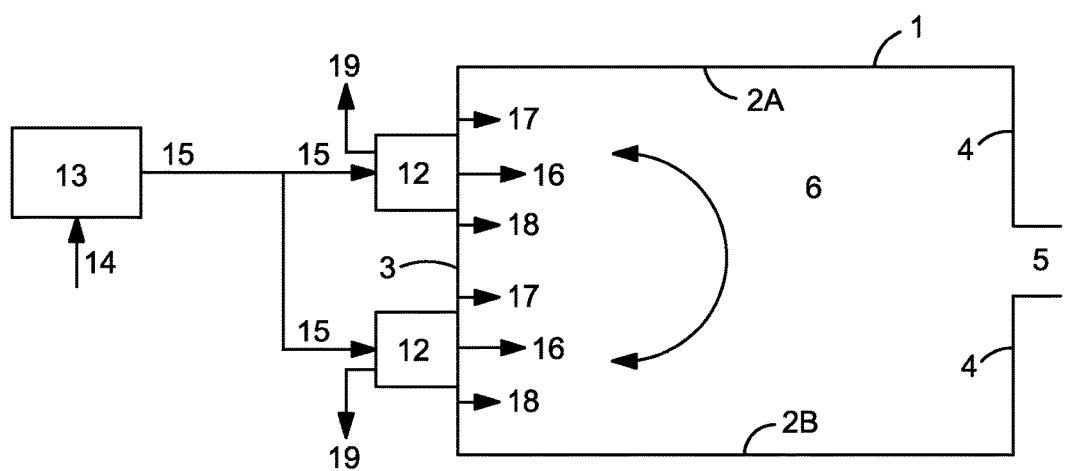
FIG. 2 is a schematic top view of another embodiment of a furnace and associated equipment with which the present invention can be practiced.

Referring to FIGS. 1 and 2, furnace 1 is a glassmelting furnace or any other furnace in which a charge is exposed to very high temperatures provided by combustion within the furnace. Examples of other furnaces with which the present invention may be practiced include incinerators, and furnaces for melting nonferrous such as copper or aluminum, and furnaces for heating or reheating iron and steel objects such as bars, rods, and ingots.

In a glassmelting furnace, glassmaking ingredients such as soda ash, niter, silica, sodium silicate, and/or pieces of broken glass ("cullet") are fed into the furnace where they are melted together to form a bath 6 of molten glass. Furnace 1 includes side walls 2A and 2B, end wall 3, and front wall 4 which includes opening 5 through which molten glass can flow out of furnace 1.

Furnace 1 can be provided with a plurality of regenerators 11 in side walls 2A and 2B. FIG. 1 illustrates an embodiment of such an arrangement, with two pairs of regenerators in the side walls. Furnace 1 can be provided with a plurality of regenerators in the end wall 3. FIG. 2 illustrates an embodiment of such an arrangement, with one pair of regenerators 12 in end wall 3.

Gaseous oxidant stream 15 is fed into regenerators 11 and 12. Oxidant stream 15 has an oxygen content of 60 vol. % to 85 vol. %, preferably 65 vol. % to 80 vol. %, and more preferably 65 vol. % to 75 vol. %.

The oxidant stream 15 having the desired oxygen content can be provided in any of several ways. It can be obtained from a separate commercial source already at the desired oxygen content. It can be obtained by combining air and a higher-content stream whose oxygen content is higher than the desired final oxygen content for stream 15; in this case the higher-content stream can be obtained from a separate commercial source, or can be produced by an on-site commercial air separation unit such as those described herein which produces a product stream having an oxygen content higher than 60 vol. % and more preferably higher than 85 vol. %.

Most preferably, oxidant stream 15 having the desired oxygen content of 60 vol. % to 85 vol. % is produced from an on-site air separation unit 13.

Air separation unit 13 is apparatus, preferably a vacuum pressure swing adsorption (VPSA) or pressure swing adsorption (PSA) or temperature swing adsorption (TSA) apparatus, which treats a feed stream 14 to produce an oxidant stream 15. Feed stream 14, which is preferably air, has an oxygen content lower than 60 vol. %. Cyclic adsorption processes are well known and are typically used to separate a more absorbable component gas from a less absorbable component gas. Examples include pressure swing adsorption (PSA) or vacuum pressure swing adsorption (VPSA) processes which use a low pressure or a vacuum and a purge gas to regenerate the sorbent, and temperature swing adsorption (TSA) processes which use a thermal driving force such as a heated purge gas to desorb the impurities. Such processes are generally used to separate oxygen or nitrogen from air, other impurities like hydrocarbons and/or water vapor from feed air gases, hydrogen from carbon monoxide, carbon oxides from other gas mixtures, and the like. These processes are also used to remove impurities such as water vapor and hydrocarbons from air prior to cryogenic air separation. Any cyclic adsorption system for separating or purifying gas components can be used in unit 13.

For illustrative purposes, a typical VPSA process for separating oxygen from air is described herein although the present invention can be employed with other cyclic adsorption processes using centrifugal compressors and is not intended to be limited to this process. The typical cyclic VPSA process is one wherein an adsorber bed undergoes the following stages:

(A) The adsorber bed, which comprises adsorbent that preferentially adsorbs the gas or gases to be removed (such as nitrogen when the feed gas is air) is pressurized to a desired pressure wherein the gas or gases to be removed will be readily adsorbed by the adsorbent as the feed air is passed across the bed;

(B) Product gas rich in oxygen is produced and recovered as the nitrogen in the feed air is adsorbed;

(C) The bed containing the adsorbent is evacuated to a low pressure (typically under vacuum) wherein the adsorbed nitrogen is desorbed from the adsorbent in the adsorber bed; and, preferably, (D) A purge gas is passed through the bed to remove any remaining nitrogen.

The cycle time is understood by the skilled person to mean the amount of time needed to complete one cycle; e.g. the process steps in order and then return to the starting condition.

Suitable adsorbents are readily familiar to those who practice in this technical field, and can be identified in the open literature.

Some adsorption processes will have more steps or multiple beds and often use one or more blowers for each of the pressurization and depressurization steps. If the VPSA plant contains two or more adsorber vessels, each vessel undergoes the above steps; however, the two vessels are operated out of phase so that while one vessel is producing product the other is being regenerated. Also, in a two bed process two blowers are typically used wherein one is dedicated to feeding gas to the adsorber vessels while the other dedicated to evacuating the adsorber vessels.

Regardless of whether a single vessel, two vessels, or even more vessels are used, the pressures and flows within the process change quickly as the process cycles from adsorption to desorption. Generally, the pressure of a vessel will change from a low pressure condition of at or below atmospheric, preferably below atmospheric, such as about 6 to 8 psia, to a high pressure condition of above atmospheric, such as about 19 to 24 psia, in a rapid periodic cycle time, such as less than one minute. Some adsorption processes will require even wider spans of pressures and/or vacuums in similar rapid cycle times.

There is ample published technical literature in the field of adsorption processes for producing oxidant streams of the composition described herein, including patents such as U.S. Pat. No. 4,643,743 and patents citing or cited in that patent.

The desired oxygen content of oxidant stream 15 that is produced by unit 13 is achieved by operating unit 13 in an increased oxygen product/feed air ratio mode. Operating in this manner increases the oxygen recovery and the amount of contained oxygen produced by the air separation unit, while the oxygen concentration in the product oxidant stream and the power requirement are reduced, relative to conventional mode of operation in which the air separation units are designed to produce oxidant product having an oxygen purity of 90% or more.

Oxidant stream 15 that is produced by unit 13 is typically at a pressure of 19.7 to 64.7 psia and is typically at a temperature of below ambient to 200° C. Oxidant stream 15 is conveyed by suitable piping to each regenerator.

Each regenerator is configured so that oxidant 15 can be fed into the regenerator outside furnace 1, and so that oxidant can pass through the regenerator and emerge out of oxidant port 20 (seen in FIG. 3) as heated oxidant 16 into furnace 1. Each regenerator is also configured so that flue gas, comprising gaseous products of combustion in furnace 1, can pass into port 20 and through the regenerator and can emerge from the regenerator as flue gas stream 19. Each regenerator is made of material such as ceramic refractory material, and may contain objects such as balls or checkerwork made of ceramic refractory material, wherein the material can be heated by hot flue gas that passes through the regenerator, and the material can heat gas such as oxidant 15 that passes through the regenerator at a temperature lower than the temperature of the regenerator material.

Each regenerator includes suitable valves and controls for the valves, to enable the operator to control whether the flow of gas through the regenerator is the oxidant 15 flowing from outside furnace 1 into furnace 1, or is flue gas 19 from inside furnace 1 out through the regenerator to the atmosphere, to a collector, to another heat exchanger where the heat of the flue gas can be recovered, or to another industrial process.

As shown in FIG. 1, at least two streams 17 and 18 are associated with each stream of heated oxidant 16 that emerges from a regenerator into furnace 1. Streams 17 and 18 comprise fuel that is combusted in furnace 1 with heated oxidant 16.

Figure 3:
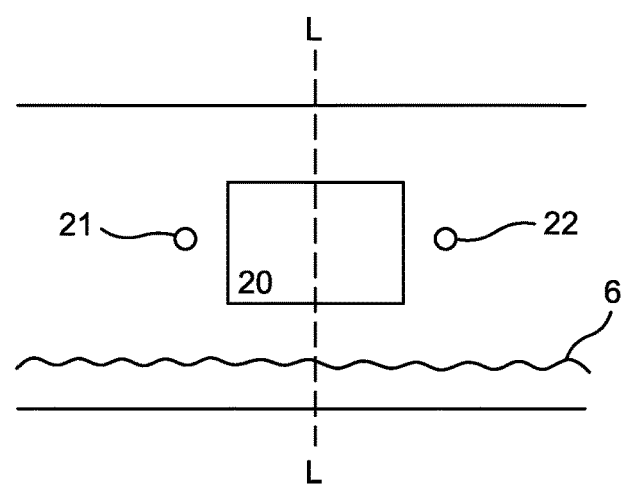
FIG. 3 is a front plan view of an interior wall of the furnace shown in FIG. 1.

Referring to FIG. 3, oxidant port 20 is the opening from which heated oxidant emerges from the regenerator into the interior of furnace 1. Also, as mentioned, flue gas 19 leaves the interior of furnace 1 into the regenerator through oxidant port 20. As also seen in FIG. 3, fuel ports 21 and 22 are located on opposite sides of an imaginary vertical line L that passes through the center of oxidant port 20. The distance of each fuel port from the center of the associated oxidant port 20 is 10 to 60 fuel port diameters, preferably 30 to 50 fuel port diameters. Fuel stream 17 is fed into furnace 1 through fuel port 21, and fuel stream 18 is fed into furnace 1 through fuel port 22. Fuel streams 17 and 18 are fed from outside furnace 1 and do not pass through a regenerator. Suitable fuels include any gaseous hydrocarbon, such as natural gas, methane, propane, and the like.

Fuel ports 21 and 22 are oriented so that their axes are horizontal or form an angle that is up to 10 degrees below horizontal, preferably up to 6 degrees below horizontal and up to 10 degrees, preferably up to 6 degrees toward the imaginary vertical line L that passes through the center of oxidant port 20. This feature helps protect the refractory sidewalls and crown of the furnace from excessive heat. For the end wall configuration, FIG. 2, oxidant port 20 in the end wall is oriented so that its axis forms an angle that is up to 10 degrees toward the center of the furnace, preferably up to 6 degrees toward the center of the furnace. This feature helps protect the refractory side wall of the furnace from excessive heat.

The oxidant port 20 is elevated from the surface 6 of the molten material so that the combustion zone and the flame do not directly impinge on the surface of the molten material, and the heated oxidant circulates within the furnace to prevent buildup of volatile alkali species in close proximity to the crown of the furnace (i.e. the interior surface of the top of the furnace). By reducing the amount of alkali volatilization in the furnace and concentration close to the crown, this feature allows standard refractory materials such as those used in air-fuel furnaces to be used in the entire furnace of the present invention, reducing the cost of furnace construction. Preferably, the oxidant port 20 is positioned so that the bottom of the port opening is in the range of 0.76 to 1.52 m (30 to 60 inches) above the molten glass material. More preferably the oxidant port 20 is positioned so that the bottom of the port opening is in the range of 0.89 to 1.27 m (35 to 50 inches) above the molten glass material. Doing so reduces the rate of alkali volatilization from the molten glass and the concentration of volatile species close to the furnace crown.

Fuel ports 21 and 22 are elevated from the surface 6 of the molten material so as to entrain furnace gases and to reduce the peak temperature of the high temperature oxidant-fuel flame. Furthermore, the elevation ensures that the combustion zone and the flame do not directly impinge on the surface of the molten material and the resulting velocity magnitude of the flame on the surface of the glass material is reduced. Preferably, the fuel ports 21 and 22 are positioned at least 0.7 m (27.6 inches) above the molten glass material. More preferably the fuel ports 21 and 22 are positioned at least 0.9 m (35.5 inches) above the molten glass material. Doing so reduces the resulting velocity magnitude of the flame on the surface of the glass material, reduces the rate of alkali volatilization from the surface of the molten glass, and the concentration of volatile species close to the furnace crown.

In operation, each regenerator alternates between a combustion stage in which oxidant passes through the regenerator and is combusted in furnace 1 with fuel, and an exhaust stage in which hot gaseous combustion products pass from furnace 1 through the regenerator and out as stream 19.

In the combustion stage, oxidant 15 is fed into and through a regenerator which has already been heated as described herein. The oxidant emerges from oxidant port 20 into furnace 1 as heated oxidant 16. The temperature of heated oxidant stream 16 is 500° C. to 1400° C., preferably 800° C. to 1350° C., and more preferably 1100° C. to 1350° C. The temperature of the heated oxidant can be achieved by appropriate adjustment of the temperature to which the regenerator is heated, the flow rate of the oxidant 15 into and through the regenerator, and the length of time that the oxidant 15 is exposed to heat within the regenerator. The velocity of the oxidant emerging from oxidant port 20 is 2 to 20 meters per second (m/sec).

Fuel is fed from fuel ports 21 and 22 into furnace 1 and is combusted with the heated oxidant 16. Additional fuel ports can be used in the furnace of this invention to inject natural gas into strategic locations within the furnace to tailor the furnace temperature profile. The stoichiometric ratio of fuel to oxidant is preferably in the range to promote complete combustion of the fuel and result in preferably 1% to 2.5% excess oxygen in the flue gas. The fuel from fuel port 21 and 22 are fed at a velocity of 40 to 350 m/sec, preferably 60 to 250 m/sec. Ports 21 and 22 may be operated at different velocities. The differing velocities at the two fuel ports controls the heat release profile of the flame in the furnace. High fuel velocities can be used for the fuel ports removed from the furnace sidewalls and aids in entraining the furnace atmosphere into the fuel before it combusts with the preheated oxidant stream, lowering the peak flame temperature in the furnace, the amount of nitrogen oxides that are formed, and prevents overheating of the refractory walls by the high flame temperatures formed by the preheated oxidant-fuel mixture. Low fuel velocities can be used for fuel port close to the furnace sidewalls, reducing the rate of mixing of the fuel and the high temperature oxidant stream, reducing the rate of heat release and peak flame temperature close to the furnace sidewalls.

Oxidant and fuel are introduced under pressure through the regenerator port and fuel nozzles, respectively, and directed toward the combustion zone. The velocity of the oxidant and the velocities of the fuel streams are provided by the dimensions of the fuel nozzles and regenerator ports, and the oxidant and fuel streams feed rates, which may vary depending on the type of process, the amount of material being processed, and the type of fuel being used. The fuel ports 21 and 22 will preferably have an internal area in the range of 0.0005 to 0.0127 $m^2$ (1 to 5 inches interior diameter) and the oxidant port 20 will preferably have an internal area in the range of 0.5 to 4 $m^2$.

The flow of oxidant through the regenerator, which cools the regenerator because of the heat transfer to the oxidant, is continued up until the regenerators bricks are sufficiently cooled, after which the operation of the furnace is reversed. The point at which the flows are reversed is determined based on factors familiar to those who practice in this field; factors include the desire to optimize the recovery of waste heat from the furnace flue gas and the preheat temperature of the oxidant stream entering the furnace.

Then, the flow of oxidant through the regenerator is shut off, and the flow of flue gas from within furnace 1 into oxidant port 20 and through the regenerator and out of the regenerator as stream 19 begins. The flue gas heats the regenerator, to provide heat which eventually heats the next flow of oxidant that passes through the regenerator. In the embodiment of FIG. 1, oxidant and fuel had been flowing into furnace 1 from the regenerators at the top of the figure with flue gas exiting through (and heating) the regenerators at the bottom of the figure.

The temperature of the flue gas (i.e. hot gaseous combustion products) leaving furnace 1 is typically at least 1400° C. and is typically in the range of 1100° C. to 1550° C. Preferably, the temperature of the flue gas exiting the regenerator is reduced by at least 300° C. and is at least 500° C. The high temperature of the flue gas that leaves the regenerator helps to lessen or prevent deposits from forming on the surfaces within the regenerator. Such deposits could include volatilized components from the molten charge within furnace 1, or products formed by interaction between such volatilized components and products of the combustion of the fuel and the oxidant. The high temperature of the flue gas helps ensure that the volatilized byproducts remain volatile all the way through and out of the regenerator. This feature reduces the rate of fouling and plugging of the heat recovery device and prolongs the service life of the regenerators and the furnace operation. Preferably all of the gaseous combustion products produced by combustion of the fuel and the oxidant leave the interior of furnace 1 through one or more of the regenerators.

The invention provides numerous advantages.

One advantage is that the heating of the charge is achieved at an improved overall energy efficiency, even though the oxidant used in this invention contains more nitrogen than would be present in a higher-purity oxygen stream typically used in oxy-fuel combustion, reducing the amount of fuel and oxidant required for the process.

The invention also lessens NOx formation in the furnace, even though the oxidant used in this invention contains more nitrogen than would be present in a higher-purity oxygen stream typically used in oxy-fuel combustion.

The invention also lessens alkali volatilization, and concentration in close proximity to the furnace crown, compared to conventional oxyfuel furnace operation.

The invention also lessens the heat recovery device fouling and plugging, extending the service life of the regenerators.

What is claimed is:

1. A method of operating a furnace containing a charge to heat the charge, comprising:
    (A) providing gaseous oxidant comprising 60 vol. % to 85 vol. % oxygen;
    (B) passing the gaseous oxidant through a heated regenerator and out of an oxidant port into a furnace, to heat the oxidant in the regenerator so that it emerges from the oxidant port at a temperature of 500° C. to 1400° C., and to thereby cool said regenerator; and feeding gaseous fuel into said furnace through two or more fuel ports and combusting the fuel in the furnace with heated oxidant emerging from said oxidant port to produce gaseous hot products of said combustion which heat the charge;
    (C) discontinuing the flow of oxidant through the regenerator into the furnace, and passing said combustion products into said oxidant port and through and out of said cooled regenerator to heat said regenerator, wherein the temperature of the combustion products that pass out of said regenerator is at least 500° C.; and
    (D) alternating steps (B) and (C),
wherein said oxidant port and said fuel ports are located above the top surface of said charge in said furnace;
    wherein at least one of said fuel ports is located on each side of a vertical line passing through the center of said oxidant port and said fuel ports are located 10 to 60 fuel port diameters from said oxidant port; and
    wherein the fuel that is combusted with oxidant from a given oxidant port is fed into the furnace from two or more fuel ports at velocities of 40 to 350 m/sec, and the oxidant is fed into the furnace from the oxidant port at a velocity of 2 to 20 m/sec, wherein the fuel fed from said fuel ports entrains gaseous combustion products in said furnace before combusting with the high temperature oxidant stream.

2. The method according to claim 1 wherein the bottom of the oxidant port opening is 0.76 to 1.52 m (30 to 60 inches) above the charge in the furnace.

3. The method according to claim 1 wherein the oxidant velocity is between 2 and 20 m/sec.

4. The method according to claim 1 wherein gaseous oxidant from each oxidant port combusts with fuel that is fed from at least 2 fuel ports.

5. The method according to claim 4 wherein the fuel that is fed from the at least 2 fuel ports and that combusts with oxidant from an oxidant port is fed at different velocities.

6. The method according to claim 4 wherein a fuel port is oriented to direct the flame toward the center of the oxidant port centerline.

7. The method according to claim 1 wherein the fuel is fed from the fuel ports at velocities between 40 and 350 m/sec.

8. The method according to claim 1 wherein said gaseous fuel from the fuel port close to the furnace refractory wall is fed at a lower velocity to achieve reduced entrainment of the gaseous oxidant to lessen the energy release close to the walls of the furnace, while said gaseous fuel from the fuel ports removed from the furnace side walls is fed at higher velocities to enhance the entrainment of furnace flue gases before combusting with the oxidant stream.

9. The method according to claim 1 wherein one or more of the fuel ports are 0.7 m or more above the charge in the furnace.

10. The method according to claim 1 wherein the oxidant opening has an aspect ratio, $A_1$(oxidant)/$A_2$(fuel), of greater than or equal to 500.

11. The method according to claim 1 wherein gaseous oxidant fed from an oxidant port sweeps the furnace crown, preventing buildup of volatile alkali close to the furnace crown.

* * * * *